Patented Oct. 15, 1940

2,217,846

UNITED STATES PATENT OFFICE 2,217,846

CONDENSATION PRODUCTS OF BETAINE-LIKE CONSTITUTION AND A PROCESS OF PREPARING THEM

Ludwig Orthner and Gerhard Balle, Frankfort-on-the-Main, Johann Rosenbach, Wiesbaden, and Kurt Bonstedt, Frankfort-on-the-Main, Germany, assignors, by mesne assignments, to General Aniline & Film Corporation, New York, N. Y., a corporation of Delaware No Drawing. Application March 14, 1939, Serial No. 261,760. In Germany March 18, 1938

6 Claims. (Cl. 260—501)

The present invention relates to condensation-products of betainelike constitution and to a process of preparing them.

We have found that valuable condensation products of betainelike constitution may be obtained by causing a compound of the general formula: R—X—CH$_2$—Hal, wherein R stands for a hydrocarbon radical with at least 4 carbon atoms which may be interrupted by hetero atoms, for instance O or S; X stands for O or S, and Hal stands for a halogen atom, to react with an alpha- or gamma-aminocarboxylic acid disubstituted at the nitrogen, in the presence of an acid-binding agent, for instance an alkali metal hydroxide or carbonate or with an ester of such aminocarboxylic acid, and saponifying the reaction product obtained by means of the amino-carboxylic acid esters.

As compounds having an ether-like structure which may be used in the process of the present invention, there may be named as examples: butylchloromethylether, dodecylchloromethylether, octadecylchloromethylether, dodecylbromomethylether, octylcyclohexylchloromethylether, the chloromethylethers of isooctylphenolmonoglycolether, dodecyldiglycolether, dodecyl-hydroxyethylsulfide, montana alcohol, abietinol and dihydroabietinol. There may further be used the thioethers corresponding to the above-named ethers, for instance dodecylchloromethylsulfide, octadecylchloromethylsulfide.

Suitable amino-carboxylic acids containing tertiary bound nitrogen or esters of such acids are, for instance: dimethylamino-acetic acid, dibutylamino-acetic acid, piperidino-acetic acid, alpha-dimethylamino-propionic acid, dimethylamino-acetic acid methyl ester, dibutylamino-acetic acid ethyl ester, gamma-diethylamino-butyric acid methyl ester, piperidino-acetic acid methyl ester, morpholino-acetic acid ethyl ester, alpha-dimethylamino-propionic acid methyl ester gamma-piperidino-valeric acid methyl ester.

The reaction is suitably carried out by adding the compound corresponding with the above-indicated formula to the ester of an amino-carboxylic acid and subsequently saponifying the product, for instance by treating it with an agent of alkaline action such as caustic soda solution, sodium carbonate or magnesium oxide, the halogen atom being, at the same time, eliminated. It is, however, also possible to cause the amino-carboxylic acid itself to react with the halogen-methyl compound, in the presence of an acid-binding agent, a suitable solvent being preferably used.

The new compounds, corresponding to the general formula:

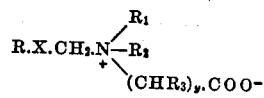

wherein R stands for a hydrocarbon radical with at least 4 carbon atoms which may be interrupted by hetero-atoms, for instance O or S; X stands for oxygen or sulfur; R$_1$ and R$_2$ stand for hydrocarbon radicals, or R$_1$ and R$_2$ together form with the nitrogen atom of the formula a heterocyclic ring system free from double bonds; R$_3$ stands for hydrogen or an aliphatic hydrocarbon radical; Y stands for 1 or 3, are, in most cases, solids which are soluble in water, especially on heating. Owing to their high capillary action, they may be used, primarily in the textile industry, as wetting, cleansing, dispersing and scrooping agents. The products may also be used in admixture with other textile adjuvants, such as soap, alcohol sulfonates, fatty acid condensation products, alkylaryl-sulfonic acids and the like.

The following examples serve to illustrate the invention but they are not intended to limit it thereto; the parts are by weight:

(1) 12 parts of a caustic soda solution of 40° Bé. are added to a feebly warmed solution of 11 parts of dimethylamino-acetic acid in 200 parts of alcohol, 32 parts of octadecyl-chloromethyl ether being then immediately added to the mixture. The whole is allowed to stand for a short time, the sodium chloride formed is removed by filtering and the alcoholic filtrate is concentrated by evaporating, under reduced pressure, at 40° C. The smeary residue is made into a paste with cold acetone and the body insoluble in acetone is filtered with suction. The latter is then recrystallized from cyclohexane. The new compound is a solid, colorless body which dissolves in hot water to a clear solution. The product has the following constitution:

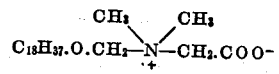

(2) 40 parts of dimethylamino-acetic acid methyl ester are added, while stirring, at 30° C. to a solution of 100 parts of octadecyl-chloromethyl ether in 500 parts of methylene chloride. The quaternary ammonium salt obtained after distilling the methylene chloride is dissolved in 1400 parts of alcohol. 120 parts of a caustic soda solution of 40° Bé. are then added to the solution and the whole is heated to boiling for 15 minutes.

After cooling, the solution is neutralized by means of hydrochloric acid and the sodium chloride which separates is removed by filtering. The alcoholic filtrate is then concentrated by evaporation and the residue is made into a paste with acetone. The colorless body which is insoluble in acetone is filtered with suction and dried, under reduced pressure, at ordinary temperature. This product is identical with that of Example 1.

(3) 80 parts of piperidino-acetic acid methyl ester are caused to run, while stirring, into a solution of 155 parts of octadecyl-chloromethyl ether in 200 parts of methylene chloride. When the reaction is complete, the solvent is evaporated under reduced pressure. The dry residue is then introduced into a solution of 140 parts of crystallized sodium carbonate in 1000 parts of water, at a temperature of 65° C. After about half an hour's stirring, saponification has occurred and a feebly opal solution has been formed, from which separates, on cooling, a betaine of the following structure:

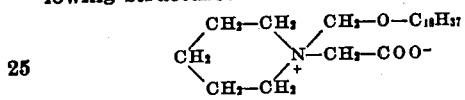

(4) A mixture of 25 parts of dodecyl-chloromethyl-sulfide, 250 parts of benzene and 20 parts of dimethyl mino-acetic acid methyl ester are heated, for some time, on the steam bath. The solvent is then distilled and the residue is dissolved in 250 parts of alcohol. 15 parts of a caustic soda solution of 40° Bé. are then added to the alcoholic solution and the whole is heated to boiling, for a short time. The whole is then neutralized by means of dilute hydrochloric acid and the sodium chloride formed is filtered. The product which remains after removal of the solvent yields, with hot water, solutions having a good foaming action.

(5) 94 parts of alpha-piperidino-propionic acid ethyl ester are run, while stirring, into a hot solution of 155 parts of octadecylchloromethyl ether in 200 parts of methylene chloride. The product obtained after evaporation of the methylene chloride is introduced, at a temperature of 60° C., into 1000 parts of a sodium carbonate solution of 5 per cent strength. After about half an hour's stirring, the product has become entirely saponified. The white product obtained after cooling is a betaine of the following structure:

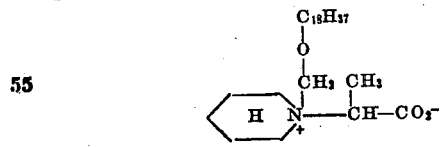

(6) 30 parts of the chloromethyl ether of iso-octylphenol-monoglycol ether dissolved in 250 parts of methylene chloride are caused to react with 16 parts of diethylamino-acetic acid ethyl ester. The solvent is then distilled, under reduced pressure, at a temperature of 20° C. to 30° C., the residue is dissolved in water having a temperature of 50° C. and 15 parts of a caustic soda solution of 40° Bé. are added thereto. The whole is stirred, for 30 minutes, at this temperature, the saponification of the ester being then complete; the product is neutralized by means of dilute hydrochloric acid and concentrated to a paste by evaporating, under reduced pressure, at a temperature of 50° C.

(7) 47 parts of gamma-diethylamino-butyric acid ethyl ester are caused to run into a solution of 80 parts of octadecyl-chloromethyl ether in 100 parts of methylene chloride. When the reaction is complete, the solvent is distilled under reduced pressure. The reaction product obtained is introduced into 700 parts of a sodium carbonate solution of 4 per cent strength, at a temperature of 60° C. to 70° C., this temperature being kept until a solution is formed. This solution has a strong foaming action; it is a betaine having the following structure:

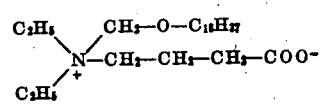

(8) 120 parts of dimethylamino-acetic acid methyl ester are added, while stirring, at a temperature of 40° C. to a solution of 318 parts of octadecyl-chloromethyl ether in 600 parts of methylene chloride. After the reaction is complete, the solvent is distilled under reduced pressure and a mixture of 600 parts of water and 160 parts of caustic soda solution of 38° Bé. is added to the residue obtained. The whole is then gradually heated to 70° C. and well stirred at this temperature for one hour. The solution is then rendered feebly alkaline to litmus by means of dilute hydrochloric acid and part of the water is removed by evaporation. A colorless paste is obtained which is readily soluble to a clear solution in hot water.

(9) 148 parts of hexadecyl-chloromethyl ether heated to a temperature of 70° C. are mixed with 60 parts of dimethylamino-acetic acid methyl ester. On mixing the mass solidifies while forming the quaternary ammonium salt, which is mixed with 300 parts of water and 80 parts of caustic soda solution of 38° Bé. and then worked up to a paste of hexadecyl-hydroxybetaine in the same manner as described in the preceding example.

(10) 147 parts of the chloromethyl ether of dodecyl-hydroxyethyl sulfide are caused to react with 60 parts of dimethylamino-acetic acid methyl ester in 500 parts of methylene chloride. After the solvent has been removed, the residue obtained is dissolved in 1200 parts of alcohol and thereupon 65 parts of caustic soda solution of 38° Bé. are added, while stirring, at a temperature of 70° C. The temperature is kept at 70° C. for further 20 minutes. After neutralizing with hydrochloric acid, the sodium chloride which has separated is filtered and the filtrate is concentrated by evaporation. The product thus obtained has the following structure:

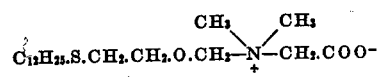

We claim:
1. The process which comprises causing a compound of the formula: $R.X.CH_2.Hal$ wherein R stands for a member of the group consisting of hydrocarbon radicals of at least 4 carbon atoms and hydrocarbon radicals of at least 4 carbon atoms containing heteroatoms as members of their carbon structure, X stands for a member of the group consisting of O and S, Hal stands for a halogen atom, to react in the presence of an acid binding agent and in the presence of water with an aminocarboxylic acid containing a tertiary amino-group selected from the group consisting of alpha-amino carboxylic acids and gamma-aminocarboxylic acids.

2. The products of the general formula:

wherein R stands for a member of the group consisting of hydrocarbon radicals of at least 4 carbon atoms and hydrocarbon radicals of at least 4 carbon atoms containing heteroatoms as members of their carbon-structure, X stands for a member of the group consisting of O and S,

stands for the radical of a secondary amine of the group consisting of aliphatic and heterocyclic secondary amines, $R_3$ stands for a member of the group consisting of hydrogen and aliphatic hydrocarbons, Y stands for a whole number of the group consisting of 1 and 3.

3. The products of the general formula:

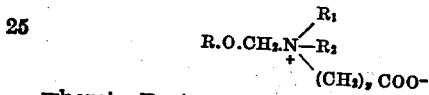

wherein R stands for a saturated aliphatic hydrocarbon radical of at least 4 carbon atoms,

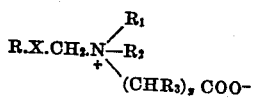

stands for the radical of a secondary amine of the group consisting of aliphatic and heterocyclic secondary amines, Y stands for a whole number of the group consisting of 1 and 3.

4. The product of the formula:

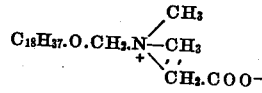

5. The product of the formula:

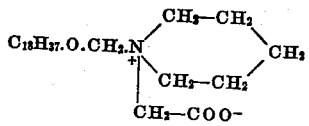

6. The product of the formula:

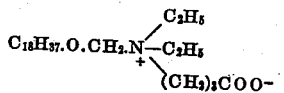

LUDWIG ORTHNER.
GERHARD BALLE.
JOHANN ROSENBACH.
KURT BONSTEDT.